United States Patent [19]

Foster et al.

[11] 4,236,312
[45] Dec. 2, 1980

[54] APPARATUS FOR CUTTING VEGETATION

[75] Inventors: Gary H. Foster; Marco H. Lombard, both of Houston, Tex.

[73] Assignee: Emerson Electric Co., St. Louis, Mo.

[21] Appl. No.: 12,628

[22] Filed: Feb. 16, 1979

[51] Int. Cl.³ .................... A01D 55/18; A01G 3/06
[52] U.S. Cl. .................................... 30/276; 56/12.7
[58] Field of Search ............ 30/276, 347; 56/12.7, 56/295

[56] References Cited

U.S. PATENT DOCUMENTS

| 4,104,796 | 8/1978 | Sheldon | 30/276 |
| 4,138,810 | 2/1979 | Pittinger | 30/276 |

Primary Examiner—Jimmy C. Peters

[57] ABSTRACT

Apparatus for cutting vegetation with a rotatable head carrying a non-metallic cutting line extended into a cutting plane. Additional line is extended from a supply line coil within the head into the cutting plane without independent operator action. A mechanism in the head automatically feeds replacement line whenever the free end of the cutting line is reduced to less than a predetermined maximum length in the cutting plane. The cutting line length is always extended to this predetermined maximum length irrespective of the length of cutting line being lost to wear or breakage. The line feeder mechanism is actuated by sensing an operating condition of the head, e.g., angular velocity of rotation.

4 Claims, 5 Drawing Figures

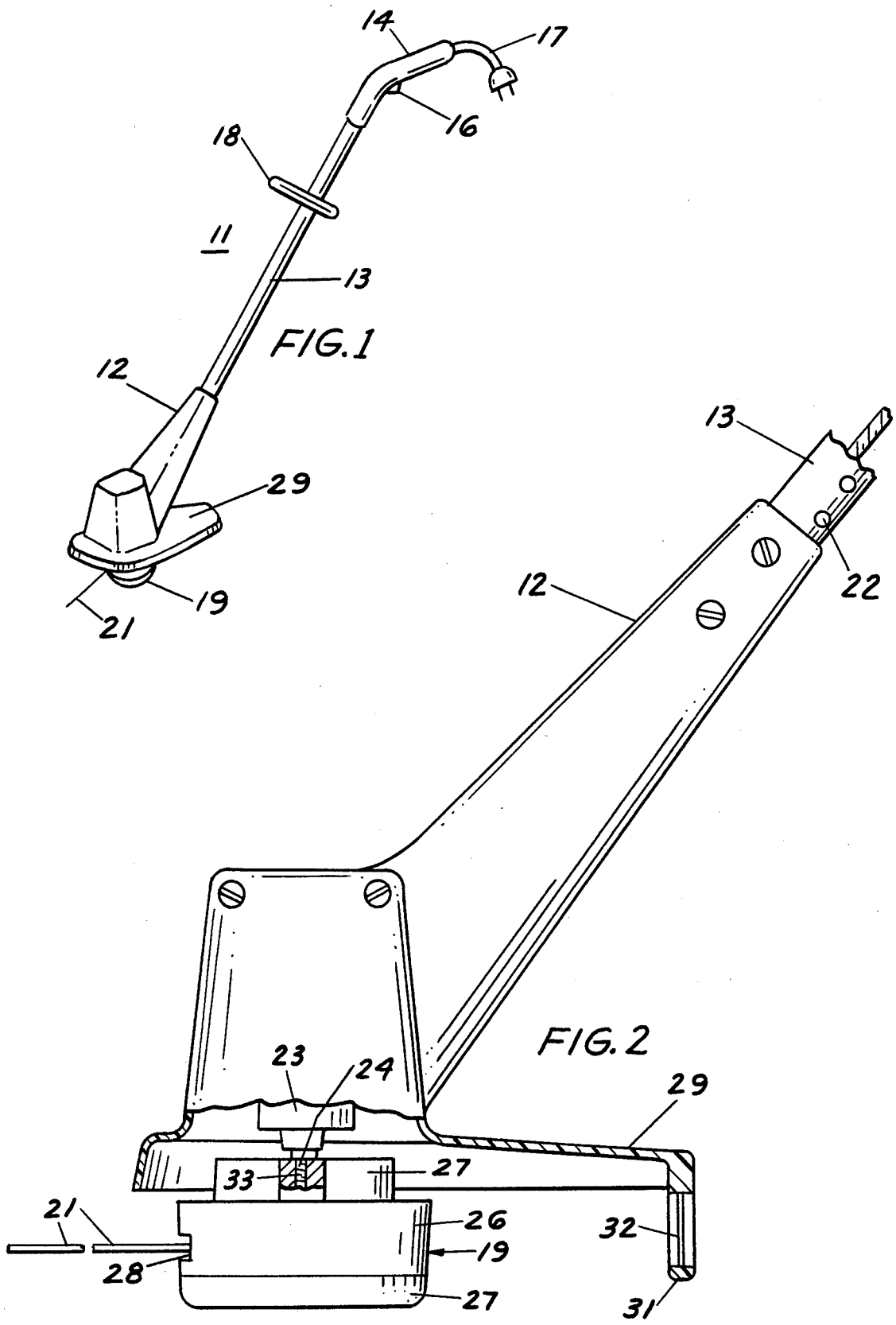

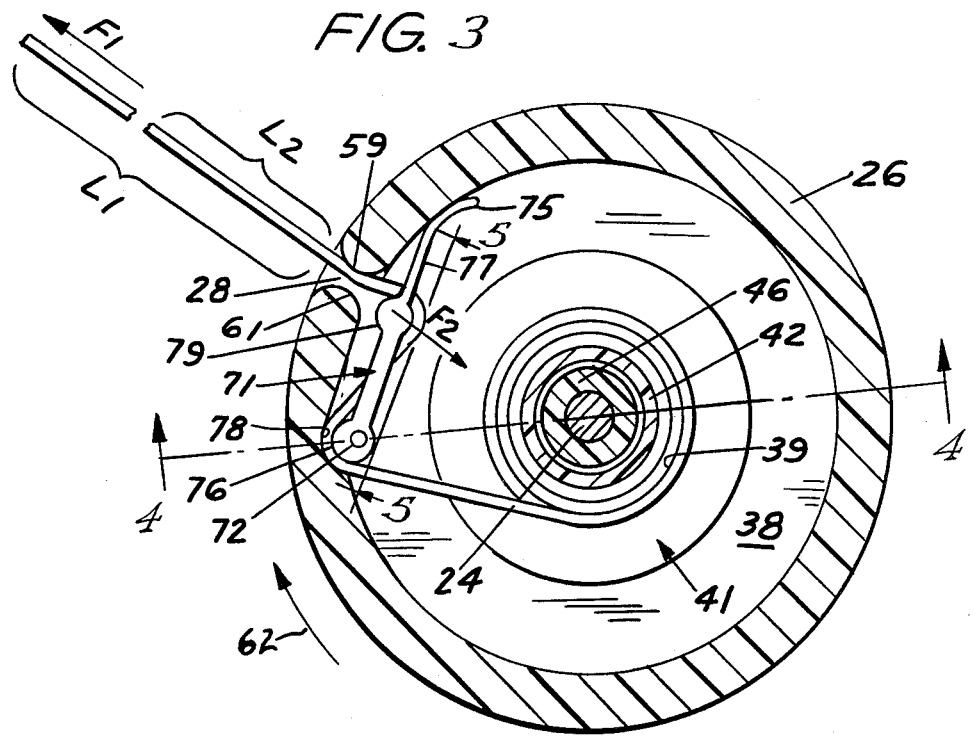
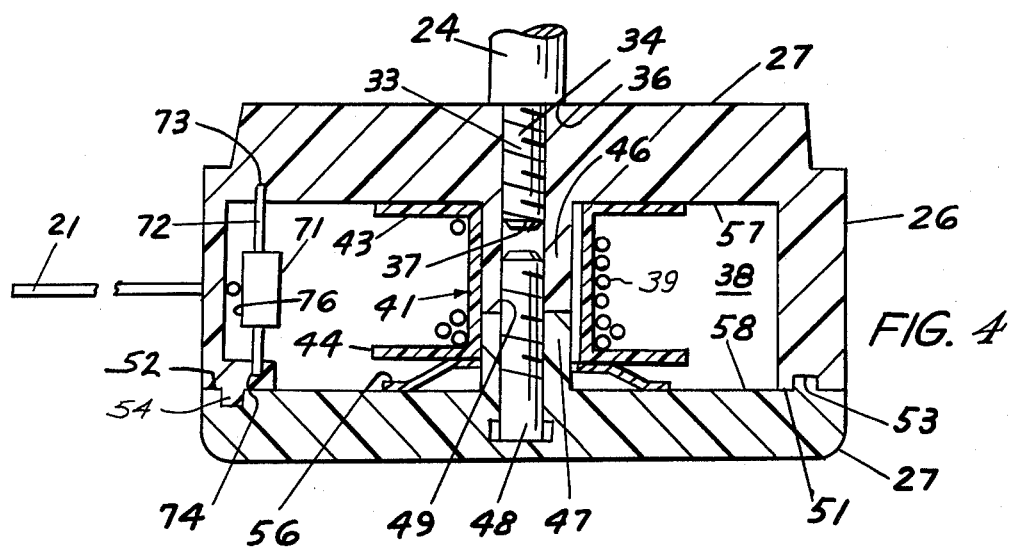
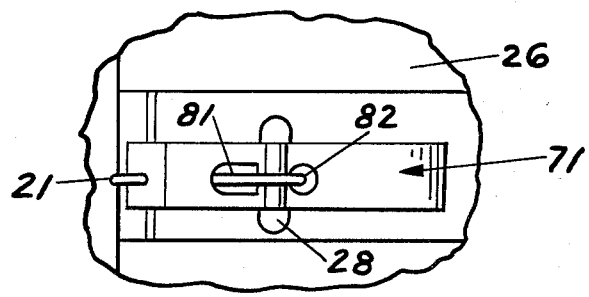

APPARATUS FOR CUTTING VEGETATION

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer/edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, 4,052,789, 4,054,992, 4,067,108 and 4,104,797. These patented devices have met outstanding success in that these American developments provide safer electrical or gasoline-powered tools for vegetation cutting, edging and trimming operations.

The devices shown in these patents employ a flexible cutting line, such as manufactured from Nylon ® polymer. The cutting line is carried usually upon a spool internally of a rotating head. When desired to replenish the line or to extend an additional length of it, the rotation of the head was stopped and line manually extended from the spool. This line extension procedure in the patented devices has been found to be convenient, simple and reliable. In many of the more powerful devices, especially those powered by DC electric motors, a system to extend the cutting line from the head without interrupting cutting operations was desired.

A most desirable system would be capable of feeding cutting line as needed from the head so that line feeding is independent of operator action during grass cutting. Structures directed toward this purpose are shown in U.S. Pat. Nos. 3,895,440, 4,020,550 and 4,035,915. These structures have in common a basket-weave supply of cutting line carried on the periphery of a disc with the line feeding from behind special post members. These post members have a cutting-abrading edge so that cutting line from the weave supply is bent about such edge in the free traveling end portion extending into the cutting plane. The combination function of the edge, line, angular speed, etc., is arranged so that the line posts with such edge sever the free end of the cutting line when it is worn to an ineffective length. In practice, these structures are found to waste about 25 percent of the cutting line because of the excessive length of line severed at the post's edge, e.g., three inches.

The present invention provides a rotating head with a mechanism that maintains the cutting line at its maximum preset length in the cutting plane irrespective of rates of cutting line wear or loss and without interrupting vegetation cutting or requiring independent operator action.

SUMMARY OF THE INVENTION

In accordance with this invention, there is provided an apparatus for cutting vegetation which has a head rotatable about an axis of rotation. The head may carry in a cavity a supply of a flexible non-metallic cutting line. The cutting line extends outwardly from the head through an aperture into a cutting plane. A first means secures the cutting line to the head when its free end is at a predetermined maximum length. A second means releases the cutting line for extending the cutting line through the aperture into the cutting plane. A third means actuates the second means to extend the cutting line from the aperture whenever the cutting line is shortened to less than the predetermined maximum length, irrespective of cutting line wear or loss. As a result, the cutting line in the cutting plane is maintained automatically at the predetermined maximum length during the cutting of vegetation.

DESCRIPTION OF THE DRAWINGS

FIG. 1 is a pictorial view illustrating one embodiment of the apparatus for cutting vegetation arranged according to the present invention;

FIG. 2 illustrates in enlargement the lower cutting head portion of the apparatus shown in FIG. 1;

FIG. 3 is a cross-section, in enlargement, taken centrally through the cutting head of the apparatus shown in FIG. 2;

FIG. 4 is a vertical section of the cutting head as shown in FIG. 3, taken along line 4—4; and FIG. 5 is a partial elevation of the cutting line control mechanism of the cutting head shown in FIG. 3, taken along line 5—5.

In these drawings, the several embodiments have common elements of construction in the cutting head. In regard to the several figures, like elements carry like numerals to simplify description of these embodiments of the present apparatus.

DESCRIPTION OF SPECIFIC EMBODIMENTS

Referring to Fig. 1, there is shown an apparatus for cutting vegetation which is constructed in accordance with one embodiment of the present invention. In this particular embodiment, the apparatus is a grass trimmer 11, but it could be a lawnmower, edger or other device for vegetation cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a head 19 rotatable about an axis passing through the housing 12, and the cutting line 21 extends into a cutting plane which is substantially perpendicular to the axis of rotation of the head.

In FIG. 2 there is shown an enlargement of the housing 12 carrying a plurality of air induction openings 22 in the tube 13. These openings introduce a flow of cooling air over the motor contained in the housing 12. The housing 12 includes an electric motor 23 which has a downwardly-extending drive shaft 24. The head 19 is threadedly connected to the shaft 24. The upper surface of the head 19 may be surrounded by a plurality of vanes 27 serving as a centrifugal blower for moving air radially outwardly from the head 19 during its rotation. As a result, the induced flow of air cools the motor 23 within the housing 12. The head 19 includes a hub 26 and a cover 27. The hub 26 carries in its side peripheral surface an aperture 28 through which the cutting line 21 extends radially outwardly into the cutting plane. A metal bearing surface may be placed at the aperture to protect the line 21 against undue wear and breakages. The cover 27 is releasably secured to the hub 26 by a threaded connection.

The housing 12 includes a rearwardly-extending tail part 29 which serves as a protection to the user to prevent inadvertent contact with the rotating cutting line 21. Also, the tail part provides an automatic limit to the excessive extension of the cutting line 21 from the head 19. More particularly, the tail part 29 has a downwardly-extending projection 31 in which is embedded a metal cutting blade 32. As a result, the cutting line 21, when rotated in a cutting plane by the head 19, can never have an operating length greater than the distance from the axis of rotation to the cutting blade 32. Any greater length of cutting line is automatically severed by the blade 32.

The head 19, as seen in FIGS. 3 and 4, is disc-like with a smooth peripheral side surface carrying the aperture 28 through which the cutting line 21 extends into the cutting plane. If more than one cutting line is used, each line should have a separate aperture and bearing surface. The hub 26 on one face carries integrally adapter threads 33 in which the drive shaft 24 is secured by its threads 34. In addition, the adapter threads 33 extend axially a sufficient dimension in the head 19 to form a rigid and integral connection with the shaft 24. Preferably, the shaft 24 is cylindrical with a flat circular shoulder 36 above its lower terminus 37.

The exposed external surfaces of the head 19 should be smooth in surface contour, rounded at the edges and without substantial projections and recesses capable of trapping appreciable vegetation. Preferably, the cover 27 has a smooth exposed surface, is circular in configuration with rounded corners, and is positioned coaxially aligned with the axis of rotation of the head 19.

The hub 26 forms a cylindrical cavity 38 in cooperation with the cover 27. A supply 39 of coiled cutting line is disposed within the cavity 38. The coiled cutting line is free for independent rotational and axial movements within the head 19. Preferably, the coiled cutting line is carried on a spool 41 mounted for rotation with the head.

The spool has a tubular body 42 with flanges 43 and 44 defining a space receiving the supply 39 of cutting line. The spool 41 is journaled for free rotation in the head 19 by its mounting upon posts 46 and 47 carried upon the hub 26 and cover 27, respectively.

The cover 27 carries integrally a stud 48 which is received within a threaded axial opening 49 on the hub 26. The hub and cover have meeting surfaces provided by posts 46 and 47, and annular abutting planar surfaces 51 and 52, respectively. Recess 53 and ridge 54 provide for angular alignment between the hub and cover. The cover is unthreaded for access to the cavity 38, preferably counter-directionally to head rotation.

The interior end of the coiled cutting line is secured to the spool 41. The free end of the cutting line 21 extends outwardly of the head 19 through the aperture 28. Preferably, the coiled cutting line supply 39 is wound co-directionally to the rotation of the head during vegetation cutting. This coiled line winding arrangement avoids backlash problems and unintended uncoiling of cutting line when rotation of the head is suddenly induced.

The spool 41 may be held against backlash by a ratchet device, or even a belleville spring 56, during periods when the head is accelerated in rotation. If backlash is not a problem relative to spool 41, the spring 56 can be omitted.

The aperture 28 has curved leading and trailing edges 59 and 61 which encounter the cutting line 21 during head rotation in the direction shown by arrow 62. The leading and trailing edges may carry metal bearing surfaces (not shown) to reduce breakage of the cutting line 21.

In the head of the present invention there is provided a first mechanism for securing the cutting line 21 from extension through the aperture 28 into the cutting plane when the free end of the cutting line has a predetermined maximum length $L_1$. A second mechanism is included for releasing the cutting line 21 for extending through the aperture. The second mechanism is actuated by a third mechanism for feeding cutting line whenever the free end of the cutting line has worn or shortened to any significant lesser dimension $L_2$ than the predetermined maximum length $L_1$. This length $L_2$ can be a very small difference from the maximum length $L_1$ and this difference usually results from inertia, friction, part drag, etc. For example, the present invention is expected to be able to feed cutting line when the difference between $L_1$ and $L_2$ is only a fraction of an inch (e.g., one-fourth inch). However, this device can feed line if the difference is several inches and does not require the cutting line to be extended in a fixed certain increment. Cutting line is extended in whatever length is required from wear or loss to maintain it at the predetermined length $L_1$. The third mechanism actuates the second mechanism so that the free end of the cutting line is extended to maintain the predetermined maximum length $L_1$ during vegetation cutting. Preferably, the third mechanism senses a change in one or more of the operative conditions of the head 19 during its rotation in cutting vegetation. These conditions can be, for example, the angular velocity of the rotating head, a change in this angular velocity, the torque exerted upon the head during its rotation in cutting vegetation, the centrifugal force from the cutting line 21 acting upon the head, or some other condition(s).

As seen in FIGS. 3–5, the several elements of the head 19 as previously described can be combined into a one-piece cam lock 71. In particular, the cam lock 71 as an elongated lever is mounted pivotally upon a pin 72 received in openings 73 and 74 formed in hub 26. The cam lock 71 carries at one end a curved cam surface 76 adjacent the pin 72. The other end of the cam lock carries an integral spring portion 77 which preferably is curved at end 75 where it engages the hub 26. Preferably, the cam lock 71 is metal in construction.

The pivotal movement of the cam lock 71 about the pin 72 makes the cam surface 76 move toward and from an abutment provided by a curved surface 78 formed in hub 26.

The spring portion 77 exerts a force $F_2$ upon the cam lock. However, cutting line 21 cannot be manually withdrawn from the spool 41 with the head at rest.

The cam lock 71 has a central portion 79 of cylindrical configuration to provide a rounded metal bearing surface. There are openings 81 and 82 to each side of the portion 79 through which the cutting line 21 is threaded in a loop. These openings should have smooth rounded edges to reduce cutting line injury.

The openings 81 and 82 in cooperation with the portion 79 provide for applying force $F_1$ from pull of the cutting line 21 in its loop to the cam lock 71. Also, these elements help to regulate passage of the cutting line at a restrained "drag" control by rotation of spool 41.

Referring more particularly to FIG. 3, spring portion 77 moves to an inward position when the head is at rest. However, when the head is rotating at the first angular velocity representative of the cutting line having its fully-extended predetermined maximum length $L_1$, then the force $F_1$ of the cutting line acting upon the portion 79 and the centrifugal force acting directly upon the cam lock 71 causes the cutting line to be engaged tightly between the cam surface 76 and the surface 78 and thereby be secured against extension from the rotating head. Whenever the cutting line 21 is shortened by wear or for other reasons, at least to the length $L_2$, the spring portion 77 as force $F_2$ becomes more significant relative to the force $F_1$. Now, the cam lock 71 moves inwardly and cam surface 76 moves away from surface 78. As a result, the cutting line 21 slides between surfaces 76 and 78 so as to extend smoothly outwardly through the aperture 28 until it again reaches its predetermined maximum length $L_1$. At this time, the centrifugal force $F_1$ of the cutting line 21 overcomes the force $F_2$ acting upon the cam lock 71 sufficiently as the cam lock 71 moves outwardly for cam surface 76 to pinch the line against the surface 78 and secure it against further extension from the head 19.

Although the head 19 can be manufactured in various forms and of several materials, it is preferred to manufacture the hub 26 and cover 27 of plastic material, e.g., Nylon 6 polymer. The spool 41 and cutting line can be made of a similar material. The spring 56, stud 48, cam locks, pins and spring portions can be of a metal such as steel, aluminum or various metallic combinations.

Although there has been described a particular arrangement of functions and elements in the various mechanisms employed in the head of the present invention, it is not intended that this description be the only possible arrangement of these elements to produce the results of the invention. In this regard, the functions and elements may be altered to produce the same results. All that is required for these elements is a mechanism which secures the line 31 from extension when at the predetermined maximum length $L_1$ in the cutting plane. Also, a mechanism which releases the cutting line as needed when the cutting line length has been reduced by wear or loss, irrespective of the actual length less than the length $L_1$. In addition, the mechanism provides for the automatic extension of the cutting line at its free end to maintain it at the predetermined maximum length $L_1$ upon sensing a change in one or more of the operating conditions of the rotating head.

From the foregoing, it will be apparent that there has been provided a novel apparatus for cutting vegetation which provides a convenient and safe means for extending cutting line without the individual attention of the operator. It will be appreciated that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:

1. An apparatus for cutting vegetation, comprising:
   (a) a head rotatable about an axis of rotation and said head having a peripheral aperture;
   (b) said head carrying an annular cavity to provide a storage area for a cutting line;
   (c) spool means mounted in said cavity and journaled therein for rotation about the rotational axis of said head;
   (d) a flexible non-metallic cutting line disposed in a coiled portion about said spool means with one end secured thereto and with a free end of said cutting line extending radially outwardly through said aperture into a cutting plane;
   (e) a cam lock carried by said head adjacent said aperture and adapted for movement toward an abutment on said head in response to centrifugal force, said cutting line extending between said cam lock and said abutment and secured against extension into the cutting plane during rotation of said head at a first angular velocity, said cam lock provided by an elongated cam member having an opening therethrough and partially encircled by said cutting line passing through said opening for extension through said aperture into the cutting plane, and said abutment is a curved surface whereby said cutting line is secured in a curved portion against slidable movement therebetween;
   (f) biasing means connected to said cam lock for separating said cam lock and abutment by a force acting counterdirectionally to centrifugal force; and
   (g) said cam lock and said biasing means cofunctioning during rotation of said head at any angular velocity greater than the first angular velocity whereby said cutting line upon any significant wear or loss at its free end is extended immediately from said head to the predetermined maximum length in said free end traversing the cutting plane during head rotation.

2. The apparatus of claim 1 wherein said cam lock is an elongated metal member with an integral flat spring portion at one end engaging said head and extending at its other end laterally to a terminal cam surface which moves toward and from said abutment on a pivotal mounting on said head and said cam lock includes midbody a round-edged opening provided therein traversed by said cutting line extending from said spool means through said aperture and into said cutting plane, said cam lock surface at said first angular velocity moving toward said abutment to securely embrace said cutting line therebetween and said cam lock surface moving from said abutment to release said cutting line for extension at its free end into the cutting plane at a greater angular velocity.

3. The apparatus of claim 2 wherein said cam lock is pivoted to said head adjacent said cam surface and the remote extremity of said flat spring portion is arcuate to slidably engage said head.

4. An apparatus for cutting vegetation, comprising:
   (a) a head rotatable about an axis of rotation and said head having a peripheral aperture;
   (b) said head carrying an annular cavity to provide a storage area for a cutting line;
   (c) spool means mounted in said cavity and journaled therein for rotation about the rotational axis of said head;
   (d) a flexible non-metallic cutting line disposed in a coiled portion about said spool means with one end secured thereto and with a free end of said cutting line extending radially outwardly through said aperture into a cutting plane;

(e) an elongated lever pivotally mounted to said head, a curved surface forming an abutment on said head adjacent to said aperture, said lever having a curved cam surface adapted to move toward and away from said abutment to selectively engage said cutting line, said lever responsive to rotation of said head at a first angular velocity moving said cam surface toward said abutment and securing said cutting line against extension from said head, biasing means on said lever to move said cam surface from said abutment and providing a certain force for moving said cam surface from said abutment at an angular velocity greater than the first angular velocity whenever said cutting line is shortened to less than the predetermined maximum length so that said cutting line remains at the predetermined maximum length in the cutting plane during the cutting of vegetation; and (f) said lever adjacent said aperture having second metal-surfaced openings forming metal bearing surfaces, and said cutting line threaded from the coiled portion on said spool means between said cam surface and abutment, radially inwardly through said first opening and then in a loop radially outwardly through said second opening with said free end traversing said aperture for extension into the cutting plane during head rotation.

* * * * *